(12) United States Patent
Taneja et al.

(10) Patent No.: US 11,157,325 B2
(45) Date of Patent: Oct. 26, 2021

(54) SYSTEM AND METHOD FOR SEAMLESS INTEGRATION OF AUTOMATED ORCHESTRATOR

(71) Applicant: Nutanix, Inc., San Jose, CA (US)

(72) Inventors: Manik Taneja, Bangalore (IN); Dezhou Jiang, San Jose, CA (US); Ranjan Parthasarathy, Milpitas, CA (US); Xingchi Jin, Union City, CA (US)

(73) Assignee: Nutanix, Inc., San Jose, CA (US)

( * ) Notice: Subject to any disclaimer, the term of this patent is extended or adjusted under 35 U.S.C. 154(b) by 126 days.

(21) Appl. No.: 16/518,938

(22) Filed: Jul. 22, 2019

(65) Prior Publication Data
US 2020/0394078 A1 Dec. 17, 2020

Related U.S. Application Data

(60) Provisional application No. 62/861,259, filed on Jun. 13, 2019.

(51) Int. Cl.
*G06F 9/455* (2018.01)
*G06F 9/48* (2006.01)
(Continued)

(52) U.S. Cl.
CPC ............ *G06F 9/5077* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/50* (2013.01); *G06F 9/5061* (2013.01);
(Continued)

(58) Field of Classification Search
CPC .. G06F 9/455; G06F 9/45533; G06F 9/45558; G06F 2009/4557; G06F 2009/45575; G06F 2009/45583; G06F 9/48; G06F 9/4806; G06F 9/4843; G06F 9/485; G06F 9/4856; G06F 9/50; G06F 9/5061; G06F 9/5077; G06F 9/5083; G06F 9/5088; G06F 2212/151; G06F 12/00; G06F 12/0253
See application file for complete search history.

(56) References Cited

U.S. PATENT DOCUMENTS 8,504,758 B1 * 8/2013 McHugh ............... G06F 3/0652
711/100
8,549,518 B1 10/2013 Aron et al.
(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.
(Continued)

*Primary Examiner* — Charles M Swift
(74) *Attorney, Agent, or Firm* — Foley & Lardner LLP

(57) ABSTRACT

An illustrative embodiment disclosed herein is an apparatus including a processor having programmed instructions that identify a bucket identifier corresponding to a bucket. The bucket identifier includes a prefix. The processor has programmed instructions that determine that the prefix matches a predetermined prefix, assign an expiry duration to the bucket, and, after the expiry duration, delete the bucket identifier.

20 Claims, 3 Drawing Sheets

(51) Int. Cl.
*G06F 9/50* (2006.01)
*G06F 12/00* (2006.01)
*G06F 12/02* (2006.01)

(52) U.S. Cl.
CPC .......... *G06F 9/5083* (2013.01); *G06F 9/5088* (2013.01); *G06F 12/00* (2013.01); *G06F 12/0253* (2013.01); *G06F 2009/4557* (2013.01); *G06F 2009/45575* (2013.01); *G06F 2009/45583* (2013.01); *G06F 2212/151* (2013.01)

(56) References Cited

U.S. PATENT DOCUMENTS

| | | | |
|---|---|---|---|
| 8,601,473 | B1 | 12/2013 | Aron et al. |
| 8,850,130 | B1 | 9/2014 | Aron et al. |
| 9,417,917 | B1* | 8/2016 | Barber .................. G06F 9/5027 |
| 9,772,866 | B1 | 9/2017 | Aron et al. |
| 10,684,801 | B1* | 6/2020 | Bhangria ................ G06F 3/067 |
| 2005/0050019 | A1* | 3/2005 | Schwartz .......... G06F 16/24539 |
| 2006/0072400 | A1* | 4/2006 | Anderson ............. G06F 3/0605 |
| | | | 369/47.1 |
| 2016/0050148 | A1* | 2/2016 | Xu .......................... H04L 49/35 |
| | | | 370/235 |
| 2017/0270024 | A1* | 9/2017 | Nicol .................. G06F 11/0751 |
| 2017/0308621 | A1* | 10/2017 | Wu ..................... G06F 16/9024 |
| 2019/0129844 | A1* | 5/2019 | Zhang .................. G06F 3/0608 |

OTHER PUBLICATIONS

How Do I Create a Lifecycle Policy for an S3 Bucket? https://docs.aws.amazon.com/AmazonS3/latest/user-guide/create-lifecycle.html, (Oct. 2, 2019).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

SYSTEM AND METHOD FOR SEAMLESS INTEGRATION OF AUTOMATED ORCHESTRATOR

CROSS-REFERENCE TO RELATED APPLICATION

This application is related to and claims priority under 35 U.S.C. § 119(e) from U.S. Patent Application No. 62/861,259, filed Jun. 13, 2019, titled "SYSTEM AND METHOD FOR SEAMLESS INTEGRATION OF AUTOMATED ORCHESTRATOR," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for orchestrating snapbuckets.

An illustrative embodiment disclosed herein is an apparatus including a processor having programmed instructions that identify a bucket identifier corresponding to a bucket. The bucket identifier includes a prefix. The processor has programmed instructions that determine that the prefix matches a predetermined prefix, assign an expiry duration to the bucket, and, after the expiry duration, delete the bucket identifier.

Another illustrative embodiment disclosed herein is a non-transitory computer readable storage medium having instructions stored thereon that, upon execution by a processor, causes the processor to perform operations including identifying a bucket identifier corresponding to a bucket. The bucket identifier includes a prefix. The operations further include determining that the prefix matches a predetermined prefix, assigning an expiry duration to the bucket, and, after the expiry duration, deleting the bucket identifier.

Another illustrative embodiment disclosed herein is a computer-implemented method including identifying, by a processor, a bucket identifier corresponding to a bucket. The bucket identifier includes a prefix. The operations further include determining, by the processor, that the prefix matches a predetermined prefix, assigning, by the processor, an expiry duration to the bucket, and, after the expiry duration, deleting, by the processor, the bucket identifier.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
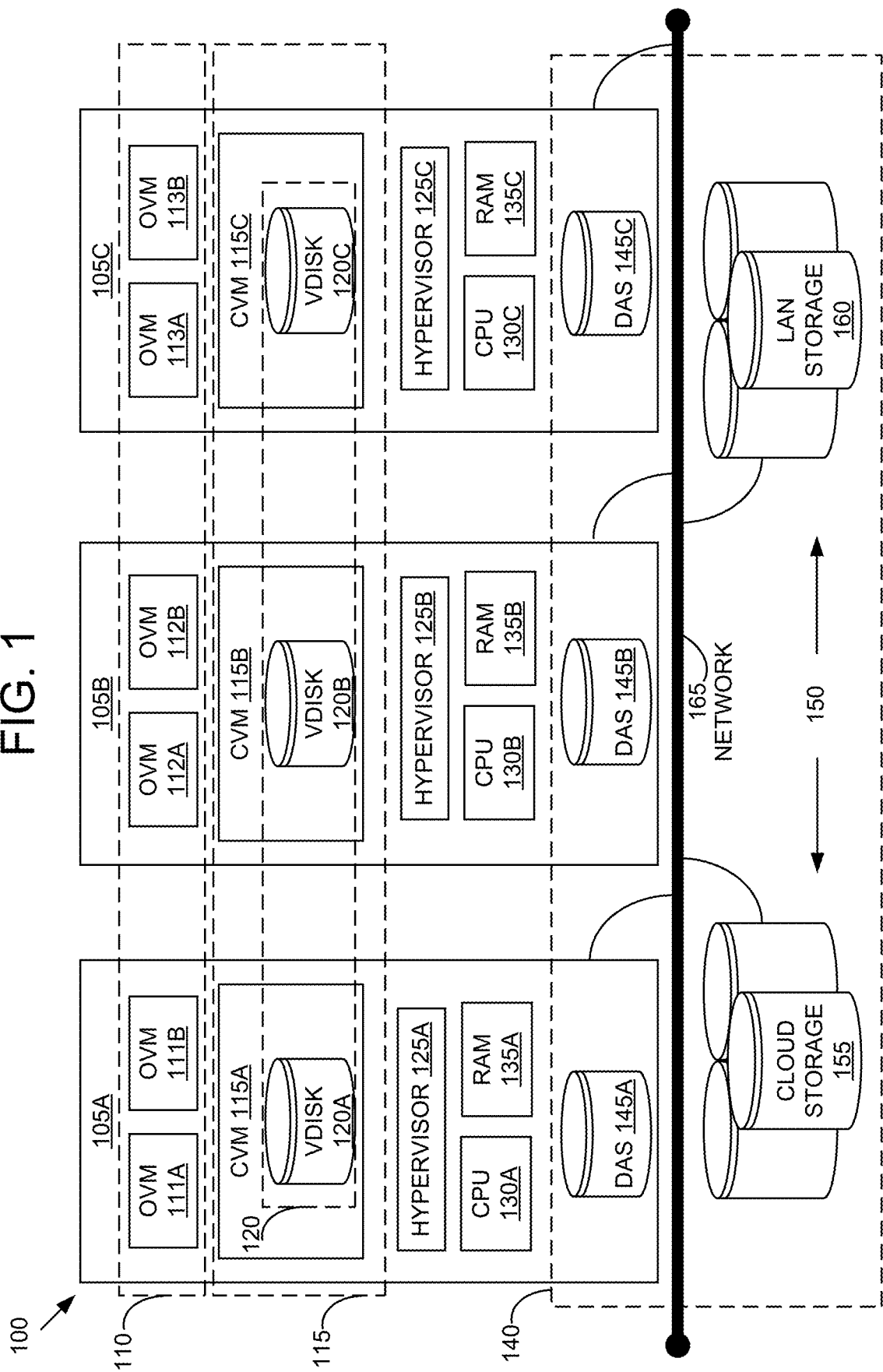
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Traditionally object store systems are typically characterized by long latencies such that the object store systems are not desirable for high performance jobs that require a large number of frequent I/O operations. However, due to the fact that object store systems have become ubiquitous in the storage world, administrators deploy additional, expensive systems to speed up their high performance jobs. In some conventional systems, the lifetime of each object in the system is tracked separately. A job is run periodically that examines each object in the system and determines whether their expiration has been reached and if so then those objects can be deleted. This object-store model does not lend itself well to bulk deletes and objects need to be deleted one by one, making the processes such as garbage collection a time and resource consuming process.

The system and method disclosed herein includes embodiments that automatically perform orchestration of high performance storage. A bucket with a predetermined expiry duration is herein referred to as a snapbucket. The system can use snapbuckets to store some objects in a volatile store. For example, the snapbuckets can be used for storing input data and intermediate data of a job that require a large number of frequent I/O operations. The system can use non-temporary buckets to store some objects in a persistent store. For example, the standard buckets are buckets for storing output data of the job in a persistent object data storage.

In some embodiments, the system identifies a bucket identifier with a designated prefix. The system can determine that a bucket associated with the bucket identifier having the designated prefix is a snapbucket and that objects for temporary and intermediate operations can go into that bucket. The system can assign an expiry duration to the snapbucket. Following the expiry period, the system can delete the bucket identifier. Deleting the bucket identifier means that the reference to the objects is lost. The volatile store deletes the objects in accordance with a volatile store policy, such that the system can reclaim space for other objects.

Some embodiments of the present disclosure expose high performance buckets over higher latency persistent storage service. The system implements a policy at the snapbucket level that applies to all objects within that bucket. In some embodiments, the auto-expiration of the snapbuckets causes the system to achieve less a faster and less resource-consuming maintenance and deletion of objects than the traditional systems. In some embodiments, the auto-expiration of the snapbuckets ensures that the volatile store does not require any explicit form of garbage collection. Because backend memory management may not be required for garbage collection, less CPU usage may be needed to complete the job than in conventional systems. In some embodiments, access to the objects in the volatile store is faster than the access to the objects in the persistent object data store, resulting in higher performance, higher bandwidth, and lower latency to complete the job than in conventional systems.

Object Virtualization Technology and Environment

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some such embodiments, the CVMs 115 form one or more Nutanix Operating System ("NOS") cluster. In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. The OVMs in the OVM cluster may be configured to run software-defined object storage service, such as Nutanix Buckets™. The OVM cluster may be configured to create buckets, add objects to the buckets, and manage the buckets and objects. In some embodiments, the OVM cluster include greater than or fewer than the OVMs 110.

Multiple OVM clusters and/or multiple NOS clusters may exist within a given virtual computing system (e.g., the virtual computing system 100). The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single stand-alone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Orchestrator of Snapbuckets

An object is a collection of unstructured data. The object may include object data and object metadata describing the object data. The object metadata may include an object identifier, an object version and a location of the object data, among others. A bucket is a logical construct that is used to store objects in an underlying storage technology. In some embodiments, the bucket includes references to object data associated with the bucket. In some embodiments, the bucket includes a data structure that maps object identifiers to locations in the underlying storage technology where the objects associated with the object identifiers are stored. In some embodiments, the bucket has policies that determine how the objects associated with the bucket are managed, updated, and replicated, among others.

In some embodiments, a VM, such as OVM 111A with respect to FIG. 1, is coupled to, or includes, the bucket. In some embodiments, the VM stores data in the underlying storage technology by writing to or reading from the bucket. The bucket can optimize where in the underlying storage technology the data is stored in view of the policies associated with the bucket. In some embodiments, the VM includes a user interface that receives instructions from a user to associate an object to the bucket (e.g. "upload" an object to the bucket or "store" the object in the bucket).

In some embodiments, the bucket is coupled to the underlying storage technology (e.g. via pointers). In some embodiments, the bucket is coupled to one or more layers that are coupled to the underlying storage technology. The one more layers can optimize the latency of uniquely identifying an object associated with the bucket. For example, the one or more layers may include indexes or additional mapping. The underlying storage technology can be nonvolatile storage such as RAM or volatile storage such as SSD. In some embodiments, the underlying storage technology includes one or more RAMs (e.g. the RAM 135A) and/or the storage pool 140 with respect to FIG. 1.

Figure 2:
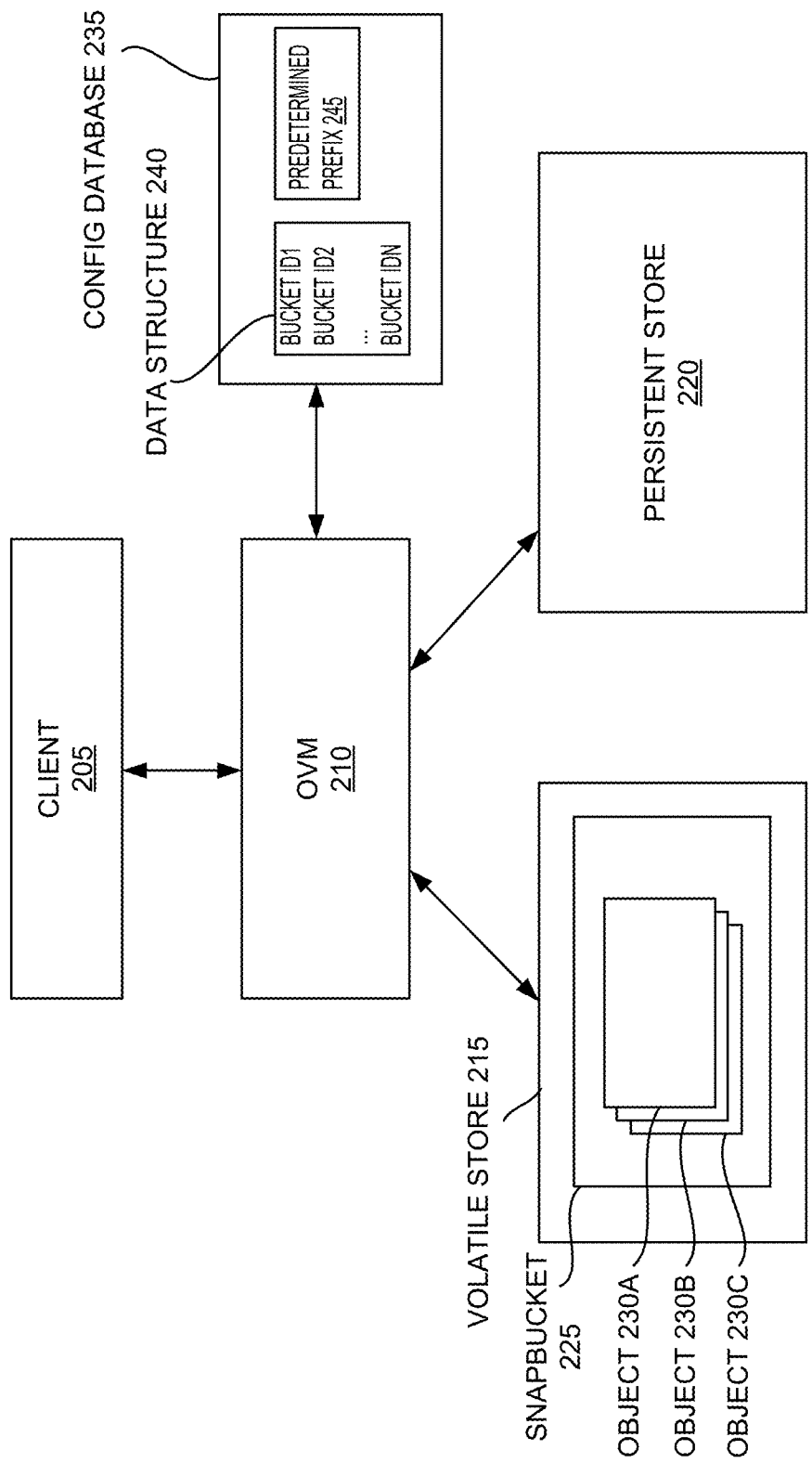
FIG. 2 is an example block diagram of a system for using snapbuckets, in accordance with some embodiments of the present disclosure.

Referring now to FIG. 2, an example system 200 for using snapbuckets 225 is shown. In brief overview, the system 200 includes a client 205, an object virtual machine (OVM) 210 coupled to the client 205, a volatile store 215 coupled to the OVM 210, a persistent store 220 coupled to the OVM 210, and a configuration (config) database 235 coupled to the OVM 210. The client 205 may be a user interface and/or an application. In some embodiments, the client 205 is a cloud service utilizing object storage. The client 205 can be configured to send a request to perform a computationally intensive job to the OVM 210.

The OVM 210 can manage an object (e.g. object data and metadata) stored in the volatile store 215 and the persistent store 220. In some embodiments, the OVM 210 includes programmed instructions to read a data structure 240 (e.g. a registry) including one or more bucket identifiers (IDs) corresponding to one or more buckets. A bucket identifier can be a name, an alphanumeric string, a binary number, and a hexadecimal number, among others. As shown in FIG. 2, the data structure includes bucket IDs 1-N. The data structure 240 can be stored in the config database 235. The OVM 210 can include programmed instructions to determine whether a bucket is assigned to the volatile store 215 or the persistent store 220 based on identifying a prefix of a bucket ID corresponding to the bucket. For example, the prefix can be "snap."

In some embodiments, the OVM 210 includes programmed instructions to determine whether the prefix of the bucket ID matches a predetermined prefix 245 indicating that the bucket is a snapbucket 225. In some embodiments, the predetermined prefix 245 is stored in the config database 235. The config database 235 may be a storage device, a virtual storage device, a RAM bank, and a virtual RAM bank, among others. In some embodiments, the OVM 210 includes programmed instructions to fetch the predetermined prefix 245 from the config database 235 and compare it to the identified prefix of the bucket. The prefix may be a prefix that is compatible with a protocol of the client 205. Thus, the client 205 does not require any additional changes in order to create the snapbuckets 225, in some embodiments.

The OVM 210 can create a snapbucket 225. The OVM 210 can receive, from the client 205, the bucket ID associated with the snapbucket 225 and add the bucket ID to the data structure 240. The OVM 210 can include, in the bucket ID, the prefix that will later be used to identify the snapbucket 225 as a bucket of the snapbucket type. In some embodiments, the bucket ID is a domain name system (DNS) compliant name. The OVM 210 can include programmed instructions to generate an IP address associated with the snapbucket 225. Subsequently, the client 205 can access the snapbucket 225 via the IP address and associate objects 230 with the snapbucket 225.

The OVM 210 can receive objects 230 from the client 205, or generate the objects 230. The OVM 210 can include programmed instructions to associate the objects 230A-C (collectively referred to herein as "objects 230") with the snapbucket 225. The newly created objects 230 may include object IDs. The OVM 210 can include programmed instructions to create a second data structure (e.g. an object list) and add object IDs of the newly created objects 230 to the second data structure. The OVM 210 can include programmed instructions to store the snapbucket 225, the objects 230, and/or the second data structure of the snapbucket 225 in the volatile store 215. In some embodiments, storing the second data structure in the volatile store 215 can speed up object listing operations for the snapbucket 225 and require less amount of CPU processing.

In some embodiments, the OVM 210 includes programmed instructions to assign an expiry duration to the snapbucket 225. In some embodiments, the data structure includes a data entry for each snapbucket 225 and the data entry includes a first field for the snapbucket ID and a second field for the expiry duration. The expiry duration can be a predefined number. A snapbucket policy can determine the predefined number. The snapbucket policy can determine the predefined number based on an expected duration of one or more jobs to which the snapbucket 225 is assigned, an amount of storage space allocated to the snapbucket 225 and/or the objects 230, a type of storage service purchased by the client 205, among others. In some embodiments, the client 205 or the OVM 210 can select the expiry duration. In some embodiments, the client 205 or the OVM 210 can override the expiry duration with a new expiry duration. The OVM 210 can include programmed instructions to detect when the expiry duration is complete. In some embodiments, the OVM 210 includes programmed instructions to delete the bucket ID from the data structure.

The volatile store 215 can be configured to store the snapbuckets 225. The volatile store 215 can include an in-memory caching platform. The volatile store 215 can include a volatile or semi-volatile NoSQL database. The volatile store 215 can include random-access memory (RAM).

In some embodiments, the OVM 210 includes programmed instructions to fetch a bucket ID from the config database 235. In some embodiments, the OVM 210 makes an I/O request to access the objects 230 that belong to the bucket 225. For example, the OVM 210 may generate a GET(bucket ID+object ID). In some embodiments, the OVM 210 includes programmed instructions to hash a concatenated ID of bucket ID and object ID to a key. In some embodiments, the OVM 210 includes programmed instructions to generate an I/O request, including the key, to retrieve the objects from the volatile store 215. For example, the OVM may generate a GET(key). The volatile store 215 can return, to the OVM 210, objects located at an index equal to the key. Thus, in some embodiments, the objects that belong to a bucket are keyed with the bucket ID+object ID and that is used as a reference to look up the objects in the volatile store 215.

When the bucket ID is deleted from the data structure, in some embodiments, the OVM 210 is unable to access the snapbucket 225 and/or the objects 230. After a time, the snapbucket 225 and/or the objects 230 may become the least recently used data in the volatile store 215. The volatile store 215 may delete the snapbuckets 225 and/or the objects 230 based on a volatile store 215 eviction policy. The volatile store 215 may delete the snapbuckets 225 and/or the objects 230 in order to reclaim space, previously occupied by the snapbucket 225 and/or the objects 230, for newer data. Thus, no explicit form of garbage collection is needed, in some embodiments. When the bucket ID is deleted from the data structure 240, in some embodiments, the volatile store 215 automatically deletes the snapbucket 225 and/or the objects 230 in order to reclaim the space. The persistent storage 120 can be configured to store persistent buckets including the output data of the job assigned to the snapbuckets 225. The persistent storage 120 may include read-only memory (ROM) such as flash memory.

One application for the snapbuckets 225 is a map reduce job. A typical map-reduce job requires a temporary staging area where input and intermediate objects 230 are stored and once the job completes they are no longer needed and can be deleted. The volatile store 215 can be used for the input and intermediate object storage while using the persistent storage 120 can be used to store the result of the computation. Upon the completion of the job the snapbucket ID can be auto-expired or explicitly deleted and the input and intermediate objects contained within the volatile store 215 may no longer be accessible. The client 205 can use snapbuckets 225 for the map-reduce applications by selecting the appropriate prefix for the bucket ID of the bucket to be used for storing the input and intermediate objects 230. In some embodiments, no further change to the application code is required.

The OVM 210 is an instance of the OVM 111A, in one embodiment. In one embodiment, the volatile store 215 includes the RAM 135. In some embodiments, the persistent store 220 includes one or more entities of the storage pool, such as the DAS 145A, the cloud storage 155, and the LAN storage 160. In some embodiments, the system 200 can include more than one client 205, more than one OVM 210, more than one volatile store 215, and/or more than one persistent store 220.

Each of the elements or entities of the virtual computing system 100 and the system 200 (e.g. the OVM 210), is implemented using hardware, software, or a combination of hardware or software, in one or more embodiments. For instance, the OVM 210 may be implemented as an apparatus comprising custom VLSI circuits or gate arrays, off-the-shelf semiconductors such as logic chips, transistors, or other discrete components. The OVM 210 may be implemented as an apparatus comprising programmable hardware devices such as field programmable gate arrays, programmable array logic, programmable logic devices, or the like. The OVM 210 can include any application, program, library, script, task, service, process or any type and form of executable instructions executed by one or more processors (e.g. the CPU 130A), in one or more embodiments. Each of the one or more processors is hardware. The instructions may be stored on one or more computer readable and/or executable storage media including non-transitory storage media such as non-transitory storage media in the storage pool 140 with respect to FIG. 1.

Figure 3:
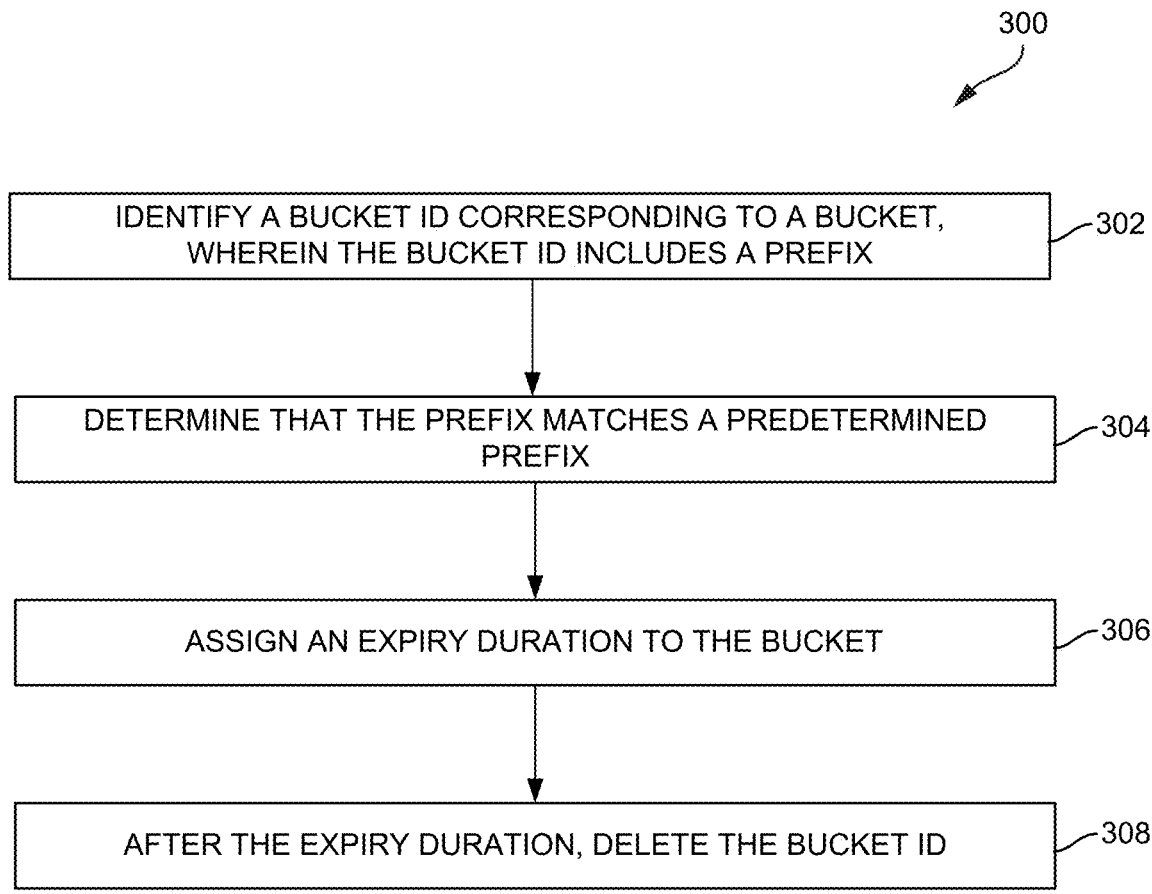
FIG. 3 is an example block diagram of a method for using snapbuckets, in accordance with some embodiments of the present disclosure.

Referring now to FIG. 3, an example method 300 for using snapbuckets is shown. The method 300 may be implemented using, or performed by, the components of the storage system 200, which is detailed herein with respect to FIG. 2. The method 300 may be implemented using, or performed by, the OVM 210, or a processor associated with the OVM 210, which is detailed herein with respect to FIG. 2. Additional, fewer, or different operations may be performed in the method 300 depending on the embodiment. In brief overview, an OVM identifies a bucket ID corresponding to the bucket (302). The bucket ID includes a predefined prefix. The OVM determines that the prefix matches a predetermined prefix (304). The OVM assigns an expiry duration to the bucket (306). After the expiry duration, the OVM deletes the bucket ID (308).

An OVM, such as the OVM 210, identifies a bucket ID corresponding to the bucket (302). The bucket ID includes a predefined prefix. For example, the prefix may include "snap." The prefix may be determined by the OVM or a client such as the client 205, among others. The client may identify in a user interface a selection that indicates a snapbucket, the OVM may receive the indication, and the OVM may map the indication to the prefix. In some embodiments, the OVM adds a bucket ID to a data structure. In some embodiments, the OVM stores, in a volatile store such as the volatile store 215, an object associated with the bucket. In some embodiments, the bucket includes a second data structure identifying the object. The object can be an input object of a map reduce job.

The OVM determines that the prefix matches a predetermined prefix (304). In some embodiments, the OVM may fetch the predetermined prefix from a location in storage. The OVM may compare the prefix to the fetched, predetermined prefix to determine whether they are same. The OVM may convert the prefix and the predetermined prefix into two arrays of ASCII values and compare each corresponding entry of the two arrays to determine a match. The prefix may be determined by the OVM, a client such as the client 205, or a bucket policy, among others. The prefix may be compatible with a protocol of the client.

The OVM assigns an expiry duration to the bucket (306). The expiry duration can be a time period represented by a number of time units. In some embodiments, the OVM can trigger a counter responsive to assigning the expiry duration.

After the expiry duration, the OVM deletes the bucket ID (308). The OVM can determine that the expiry duration has been reached by determining that the counter is greater than the number representing the expiry duration. In some embodiments, after the expiry duration, the OVM deletes the bucket ID from the data structure. In some embodiments, responsive to the bucket ID being deleted, the volatile store deletes the bucket and/or the objects associated with the bucket in accordance with an eviction policy. In some embodiments, the OVM deletes the object form the volatile store.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor having programmed instructions that:
    identify, in a bucket identifier corresponding to a bucket, a prefix that matches a predetermined prefix indicating that the bucket is backed by a volatile store;
    assign an expiry duration to the bucket;
    store, in the bucket, an object used to compute an output of a map reduce job;
    store, in a second bucket backed by a persistent store, a second object including the output of the map reduce job; and
    after the expiry duration, delete the bucket identifier.

2. The apparatus of claim 1, the processor having further programmed instructions that,
    after the expiry duration, cause the volatile store to delete the object.

3. The apparatus of claim 2, the processor having further programmed instructions that:
    retrieve the bucket identifier;
    hash a concatenation of the bucket identifier and an object identifier corresponding to the object to generate a key; and
    look up the object using the key.

4. The apparatus of claim 1, wherein the object is an input object of the map reduce job.

5. The apparatus of claim 1, the processor having further programmed instructions that:
add the bucket identifier to a data structure; and
after the expiry duration, delete the bucket identifier from the data structure.

6. The apparatus of claim 1, the processor having further programmed instructions that:
trigger a counter; and
responsive to the counter being greater than the expiry duration, delete the bucket identifier.

7. The apparatus of claim 1, wherein the predetermined prefix is compatible with a protocol of a client that specified the prefix.

8. A non-transitory computer readable storage medium having instructions stored thereon that, upon execution by a processor, causes the processor to perform operations comprising:
identifying, in a bucket identifier corresponding to a bucket, a prefix that matches a predetermined prefix indicating that the bucket is backed by a volatile store;
assigning an expiry duration to the bucket;
storing, in the bucket, an object used to compute an output of a map reduce job;
storing, in a second bucket backed by a persistent store, a second object including the output of the map reduce job; and
after the expiry duration, deleting the bucket identifier.

9. The non-transitory computer readable storage medium of claim 8, the operations further comprising,
after the expiry duration, causing the volatile store to delete the object.

10. The non-transitory computer readable storage medium of claim 9, the operations further comprising:
retrieving the bucket identifier;
hash a concatenation of the bucket identifier and an object identifier corresponding to the object to generating a key; and
looking up the object using the key.

11. The non-transitory computer readable storage medium of claim 8, wherein the object is an input object of the map reduce job.

12. The non-transitory computer readable storage medium of claim 8, the operations further comprising:
adding the bucket identifier to a data structure; and
after the expiry duration, deleting the bucket identifier from the data structure.

13. The non-transitory computer readable storage medium of claim 8, the operations further comprising:
triggering a counter; and
responsive to the counter being greater than the expiry duration, deleting the bucket identifier.

14. The non-transitory computer readable storage medium of claim 8, wherein the prefix is compatible with a protocol of a client interacting with the apparatus.

15. A computer-implemented method comprising:
identifying, by a processor and in a bucket identifier corresponding to a bucket a prefix that matches a predetermined prefix indicating that the bucket is backed by a volatile store;
assigning, by the processor, an expiry duration to the bucket;
storing, in the bucket, an object used to compute an output of a map reduce job;
storing, in a second bucket backed by a persistent store, a second object including the output of the map reduce job; and
after the expiry duration, deleting, by the processor, the bucket identifier.

16. The method of claim 15, further comprising,
after the expiry duration, causing, by the processor, the volatile store to delete the object.

17. The method of claim 16, further comprising:
retrieving, by the processor, the bucket identifier;
hash, by the processor, a concatenation of the bucket identifier and an object identifier corresponding to the object to generating a key; and
looking up, by the processor, the object using the key.

18. The method of claim 15, wherein the object is an input object of the map reduce job.

19. The method of claim 15, further comprising:
adding, by the processor, the bucket identifier to a data structure; and
after the expiry duration, deleting, by the processor, the bucket identifier from the data structure.

20. The method of claim 15, further comprising:
triggering, by the processor, a counter; and
responsive to the counter being greater than the expiry duration, deleting, by the processor, the bucket identifier.

* * * * *